United States Patent
Yamamoto et al.

(10) Patent No.: US 11,352,959 B2
(45) Date of Patent: Jun. 7, 2022

(54) FUEL SUPPLY CONTROL DEVICE

(71) Applicant: IHI Corporation, Koto-ku (JP)

(72) Inventors: Yasuhiko Yamamoto, Tokyo (JP); Naoki Seki, Tokyo (JP)

(73) Assignee: IHI Corporation, Koto-ku (JP)

(*) Notice: Subject to any disclaimer, the term of this patent is extended or adjusted under 35 U.S.C. 154(b) by 105 days.

(21) Appl. No.: 16/872,508

(22) Filed: May 12, 2020

(65) Prior Publication Data
US 2020/0340408 A1 Oct. 29, 2020

Related U.S. Application Data

(63) Continuation of application No. PCT/JP2018/037399, filed on Oct. 5, 2018.

(30) Foreign Application Priority Data

Nov. 16, 2017 (JP) ............................. JP2017-220612

(51) Int. Cl.
F02C 9/26 (2006.01)
F02C 7/232 (2006.01)
(Continued)

(52) U.S. Cl.
CPC .............. *F02C 9/263* (2013.01); *F02C 7/232* (2013.01); *F02C 9/28* (2013.01); *F02C 9/30* (2013.01);
(Continued)

(58) Field of Classification Search
CPC .. F02C 7/232; F02C 7/236; F05D 2270/3015; F05D 2270/304; F05D 2270/52; F05D 2270/54; F05D 2270/706; F05D 2270/708
See application file for complete search history.

(56) References Cited

U.S. PATENT DOCUMENTS 3,892,975 A * 7/1975 Yannone .................. F02C 9/26
290/40 R
4,171,613 A * 10/1979 Schmidt-Roedenbeck ..................
F02C 9/32
60/39.281
(Continued)

FOREIGN PATENT DOCUMENTS

EP 3 040 277 A2 7/2016
GB 2 351 777 A 1/2001
(Continued)

*Primary Examiner* — Alain Chau
(74) *Attorney, Agent, or Firm* — Oblon, McClelland, Maier & Neustadt, L.L.P.

(57) ABSTRACT

A fuel supply control device controls a fuel supply pump based on a front-rear differential pressure across a metering valve for a fuel supply amount, which is detected by a differential pressure gauge, using parallel flow passages of an orifice and a pressurizing valve as the metering valve, in which the fuel supply control device includes a first control amount generation unit generating a first control amount based on the front-rear differential pressure, a second control amount generation unit generating a second control amount based on the rotation speed of the fuel supply pump, a control amount selection unit, a subtractor, and a control calculation unit, in which the control amount selection unit selects the first control amount in a case where the rotation speed is equal to or lower than a predetermined threshold and select the second control amount in a case where the rotation speed exceeds the threshold.

18 Claims, 3 Drawing Sheets

(51) Int. Cl.
  *F02C 9/28* (2006.01)
  *F02C 9/30* (2006.01)
  *F02C 7/236* (2006.01)

(52) U.S. Cl.
  CPC .......... *F02C 7/236* (2013.01); *F05D 2200/12* (2013.01); *F05D 2220/323* (2013.01); *F05D 2260/80* (2013.01); *F05D 2270/304* (2013.01); *F05D 2270/3015* (2013.01); *F05D 2270/3061* (2013.01); *F05D 2270/706* (2013.01); *F05D 2270/708* (2013.01)

(56) References Cited

U.S. PATENT DOCUMENTS

| | | | |
|---|---|---|---|
| 4,341,071 A | 7/1982 | Abo et al. | |
| 4,612,616 A * | 9/1986 | Binns | F02C 9/28 60/39.281 |
| 5,220,793 A | 6/1993 | McGlone et al. | |
| 5,274,996 A * | 1/1994 | Goff | F02C 7/262 60/790 |
| 6,182,438 B1 * | 2/2001 | Weber | F02C 9/28 60/778 |
| 7,168,254 B2 * | 1/2007 | Riley | F02C 9/28 60/773 |
| 7,331,169 B2 * | 2/2008 | Riley | F02C 7/26 60/790 |
| 7,340,901 B2 * | 3/2008 | Riley | F02C 9/28 60/773 |
| 7,540,141 B2 * | 6/2009 | Goldberg | F02C 7/22 60/39.281 |
| 2007/0130911 A1 * | 6/2007 | Goldberg | F02C 9/28 60/39.281 |
| 2011/0208400 A1 * | 8/2011 | Lickfold | B64D 31/06 701/100 |
| 2012/0266600 A1 | 10/2012 | Bader et al. | |
| 2015/0192073 A1 | 7/2015 | Griffiths et al. | |

FOREIGN PATENT DOCUMENTS

| | | |
|---|---|---|
| JP | 7-217821 A | 8/1995 |
| JP | 2011-163209 A | 8/2011 |
| JP | 2013-506795 A | 2/2013 |
| JP | 2013-231406 A | 11/2013 |
| WO | WO 94/20739 A2 | 9/1994 |
| WO | WO 2005/033491 A1 | 4/2005 |
| WO | WO 2015/029805 A1 | 3/2015 |

* cited by examiner

FUEL SUPPLY CONTROL DEVICE

This application is a Continuation Application based on International Application No. PCT/JP2018/037399, filed on Oct. 5, 2018, which claims priority on Japanese Patent Application No. 2017-220612, filed on Nov. 16, 2017, the contents of which are incorporated herein by reference.

TECHNICAL FIELD

The present disclosure relates to a fuel supply control device.

BACKGROUND ART

Patent Document 1 discloses a fuel supply apparatus for a gas turbine engine. The fuel supply apparatus operates a centrifugal pump (low-pressure pump) and a gear pump (high-pressure pump) by controlling and driving a motor (electric motor) with a motor controller (fuel supply control device), and supplies desired fuel to fuel nozzles through parallel flow passages of a fixed orifice and a pressurizing valve. Further, the motor controller takes a front-rear differential pressure across the fixed orifice, that is, the pressurizing valve, which is detected by a differential pressure gauge, as a feedback signal; and performs the feedback control of the electric motor on the basis of a difference between the feedback signal and a command signal that is taken from full authority digital engine control (FADEC) that is a control device electrically controlling an engine for an airplane on the basis of the position of a throttle lever and inputs from various sensors.

CITATION LIST

Patent Document

[Patent Document 1] Japanese Unexamined Patent Application, First Publication No. 2013-231406

SUMMARY OF THE INVENTION

Technical Problem

The fixed orifice and the pressurising valve function as a metering valve, but there is a possibility that the front-rear differential pressure may be unstable in a high flow-rate range where the pressurizing valve is opened. Accordingly, there is a possibility that it may be difficult to perform stable fuel supply control in the high flow-rate range where the pressurizing valve is opened in the fuel supply control device in the related art.

The disclosure has been made in consideration of the above-mentioned circumstances, and an object of the disclosure is to achieve stable fuel supply control in a high flow-rate range where a pressurizing valve is opened.

Solution to Problem

According to a first aspect of the disclosure, there is provided a fuel supply control device that is configured to control a fuel supply pump on the basis of a front-rear differential pressure across a metering valve for a fuel supply amount, which is detected by a differential pressure gauge, using parallel flow passages of an orifice and a pressurizing valve as the metering valve. The fuel supply control device includes a first control amount generation unit that is configured to generate a first control amount on the basis of the front-rear differential pressure, a second control amount generation unit that is configured to generate a second control amount on the basis of a rotation speed of the fuel supply pump, a control amount selection unit that is configured to alternatively select the first control amount or the second control amount on the basis of the rotation speed and to output the selected control amount, a subtractor that is configured to calculate a deviation of an output of the control amount selection unit from a control target value and to output the deviation, and a control calculation unit that is configured to calculate an operation amount of the fuel supply pump on the basis of an output of the subtractor. The control amount selection unit is configured to select the first control amount in a case where the rotation speed is equal to or lower than a predetermined threshold and to select the second control amount instead of the first control amount in a case where the rotation speed exceeds the threshold.

According to a second aspect of the disclosure, in the first aspect, the first control amount generation unit is configured to generate the first control amount on the basis of a differential pressure-fuel supply amount conversion table showing a relationship between the front-rear differential pressure and a flow rate of fuel.

According to a third aspect of the disclosure, in the first or second aspect, the second control amount generation unit is configured to generate the second control amount on the basis of a rotation speed-fuel supply amount conversion table showing a relationship between the rotation speed and a flow rate of fuel.

According to a fourth aspect of the disclosure, in the third aspect, the second control amount generation unit is configured to generate the second control amount by correcting an output of the rotation speed-fuel supply amount conversion table on the basis of an estimation value of leakage of fuel acquired in advance about the fuel supply pump.

According to a fifth aspect of the disclosure, in any one of the first to fourth aspects, the second control amount generation unit is configured to generate the second control amount by taking a rotation speed of a motor, which drives the fuel supply pump, as the rotation speed of the fuel supply pump.

According to a sixth aspect of the disclosure, in any one of the first to fifth aspects, the control amount selection unit is configured to alternatively select the first control amount or the second control amount on the basis of a rotation speed of a gas turbine instead of the rotation speed of the fuel supply pump in a case where fuel is supplied to the gas turbine.

According to a seventh aspect of the disclosure, in any one of the first to sixth aspects, the control calculation unit is configured to calculate the operation amount of the fuel supply pump by performing PID calculation processing on the output of the subtractor.

According to the disclosure, it is possible to achieve stable fuel supply control in a high flow-rate range where a pressurizing valve is opened.

DETAILED DESCRIPTION OP THE EMBODIMENTS

An embodiment of the disclosure will be described below with reference to drawings.

A fuel supply apparatus F of this embodiment will be described first with reference to FIG. 1. The fuel supply apparatus F is a device that supplies fuel to a gas turbine G as shown in FIG. 1, and supplies a desired amount of fuel to a plurality of fuel nozzles N of a combustor (not shown) of the gas turbine G.

The gas turbine G is an internal combustion engine provided in an airplane as a thrust source for flight, and is a jet engine that obtains a thrust by jetting combustion exhaust gas, which is obtained from the combustor, rearward. That is, the fuel supply apparatus F is a device that is provided in in airplane.

Figure 1:
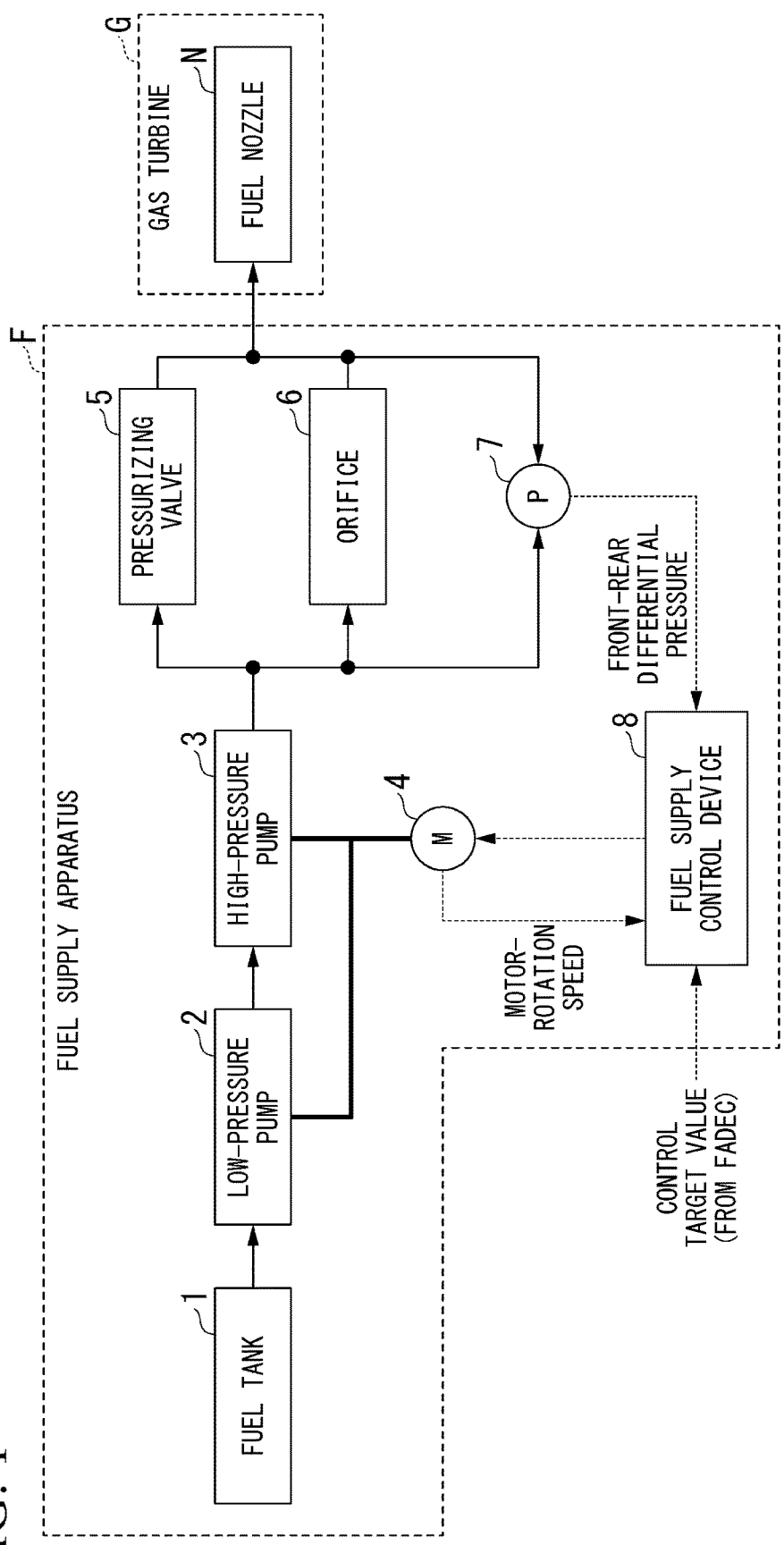
FIG. 1 is a diagram showing the system configuration of a fuel supply apparatus of an embodiment of the disclosure.

As shown in FIG. 1, the fuel supply apparatus F includes a fuel tank 1, a low-pressure pump 2, a high-pressure pump 3, an electric motor 4, a pressurizing valve 5, an orifice 6, a differential pressure gauge 7, and a fuel supply control device 8. The fuel tank 1 is a container storing a predetermined amount of fuel, and supplies fuel to the low-pressure pump 2. The low-pressure pump 2 is a centrifugal pump (non-positive-displacement pump) that pumps fuel out of the fuel tank 1, increases the pressure of the fuel up to a predetermined pressure, and discharges the fuel to the high-pressure pump 3.

The high-pressure pump 3 is a gear pump (positive-displacement pump) that increases the pressure of the low-pressure fuel supplied from the low-pressure pump 2 and discharges the fuel to the respective fuel nozzles N as high-pressure fuel. The high-pressure pump 3 is a fuel supply pump of his embodiment that finally sets the amount of fuel to be supplied (fuel supply amount) to the gas turbine G (fuel nozzles N) from the fuel supply apparatus F.

The electric motor 4 is a power source that rotationally drives the low-pressure pump 2 and the high-pressure pump 3. The output shaft (drive shaft) of the electric motor 4 is coupled to the rotating shaft (driven shaft) of the low-pressure pump 2 and the rotating shaft (driven shaft) of the high-pressure pump 3 through a predetermined coupler (not shown). That is, a certain correlator is satisfied between the rotation speed of the electric motor 4 (motor-rotation speed) and the rotation speed of each of the low-pressure pump 2 and the high-pressure pump 3. Further, the electric motor 4 outputs the motor-rotation speed, which is the rotation speed thereof, to the fuel supply control device 8 as a first detection signal. In this embodiment, for convenience's sake, the motor-rotation speed is treated as the rotation speed of the fuel supply pump.

The pressurizing valve 5 is provided at a middle portion of a fuel pipe that connects the outlet of the high-pressure pump 3 to the inlets of the fuel nozzles N. The pressurizing valve 5 is closed in a case where the amount of fuel to be discharged from the high-pressure pump 3 is relatively small, and is opened in a case where the amount of fuel to be discharged from the high-pressure pump 3 exceeds a predetermined value. As with the pressurizing valve 5, the orifice 6 is provided at the middle portion of the fuel pipe that connects the outlet of the high-pressure pump 3 to the inlets of the fuel nozzles N.

As shown in FIG. 1, the pressurizing valve 5 and the orifice 6 form parallel flow passages through the fuel pipe. That is, both the inlet of the pressurizing valve 5 and the inlet of the orifice 6 are connected to the outlet of the high-pressure pump 3 through the fuel pipe, and both the outlet of the pressurizing valve 5 and the outlet of the orifice 6 are connected to the inlets of the fuel nozzles N through the fuel pipe. The pressurizing valve 5 and the orifice 6 constitute a metering valve that detects the flow rate of fuel (fuel supply amount) to be supplied to the fuel nozzles N from the high-pressure pump 3.

The differential pressure gauge 7 is a differential pressure transmitter that detects differential pressure between the upstream side (inlet side) and the downstream side (outlet side) of each of the pressurizing valve 5 and the orifice 6 as a front-rear differential pressure. This front-rear differential pressure is pressure amount that changes depending on the flow rate of fuel, that is, a motor-rotation speed; that is, a physical quantity that corresponds to the flow rate or fuel. The differential pressure gauge 7 outputs the front-rear differential pressure to the fuel supply control device 8 as a second detection signal.

The fuel supply control device 8 controls the electric motor 4 on the basis of the first detection signal (motor-rotation speed) and the second detection signal (front-rear differential pleasure) having been described above and a control target value. The fuel supply control device 8 is a software control device that generates an operation amount of the electric motor 4 by executing a predetermined rewritable control program with predetermined hardware. The hardware includes a storage device that stores a control program and the like, a central processing unit (CPU) that directly executes a control program, an interface circuit and the like that is interposed between the CPU and the electric motor 4 and between the CPU and the differential pressure gauge 7 and transmits and receives various signals. Further, the fuel supply control device 8 is electrically connected to the electric motor 4 and the differential pressure gauge 7.

Figure 2:
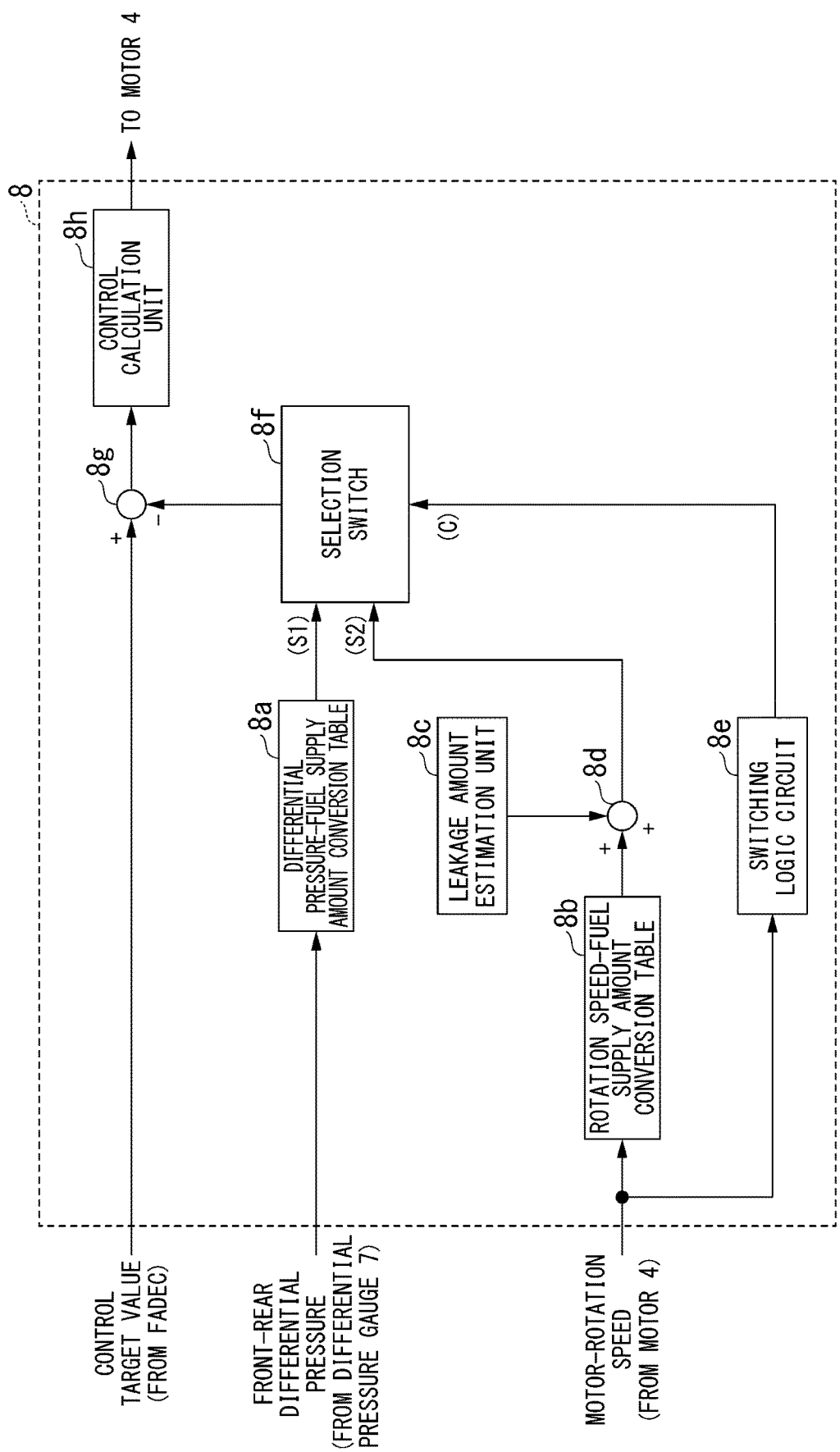
FIG. 2 is a block diagram showing the functional configuration of a fuel supply control device according to an embodiment of the disclosure.

The fuel supply control device 8 includes a differential pressure-fuel supply amount conversion table 8a, a rotation speed-fuel supply amount conversion table 8b, a leakage amount estimation unit 8c, an adder 8d, a switching logic circuit 8e, a selection switch 8f, a subtractor 8g, and a control calculation unit 8h shown in FIG. 2, as functional components that are embodied by the cooperation of the control program (software) and the hardware.

The differential pressure-fuel supply amount conversion table 8a is a control table showing a relationship between the front-rear differential pressure that is input from the differential pressure gauge 7 as the second detection signal and the amount of fuel (fuel supply amount) to be supplied to the fuel nozzles N (gas turbine G) from the fuel supply apparatus F. That is, the differential pressure-fuel supply amount conversion table 8a includes a plurality of fuel supply amount data (data group) that correspond to a plurality of front-rear differential pressure values over a predetermined range and are acquired in advance, and outputs a fuel supply amount, which corresponds to the front-rear differential pressure, to the selection switch 8f as a first control amount S1 by searching the data group on the basis of the front-rear differential pressure input from the differential pressure gauge 7. That is, the differential pressure-fuel supply amount conversion table 8a outputs the amount of fuel (fuel supply amount) to be supplied to the fuel nozzles N (gas turbine G) from the fuel supply apparatus F, which is generated due to a specific front-rear differential pressure, to the selection switch 8f as the first control amount S1. The differential pressure-fuel supply amount conversion table 8a is a first control amount generation unit that generates the first control amount S1 on the basis of the front-rear differential pressure input from the differential pressure gauge 7.

The rotation speed-fuel supply amount conversion table 8b is a control table showing a relationship between the motor-rotation speed that is input from the electric motor 4 as the first detection signal and the fuel supply amount. That is, the rotation speed-fuel supply amount conversion table 8b includes a plurality of fuel supply amount data (data group) that correspond to a plurality of motor-rotation speed values over a predetermined range and are acquired in advance, and outputs a fuel supply amount, which corresponds to the motor-rotation speed, by searching the data group on the basis of the motor-rotation speed input from the electric motor 4. That is, the rotation speed-fuel supply amount conversion table 8b outputs the amount of fuel (fuel supply amount) to be supplied to the fuel nozzles N (gas turbine G) from the fuel supply apparatus F which is generated due to a specific motor-rotation speed.

The leakage amount estimation unit 8c stores the estimation value of the leakage of fuel acquired in advance about the gear pump (positive-displacement pump) that is the high-pressure pump 3. The leakage of liquid to be discharged is generally small in the gear pump and the gear pump is excellent in linearity between a rotation speed and the amount of discharged liquid, but liquid may slightly leak from the gear pump due to a secular change or the like. The leakage amount estimation unit 8c calculates the estimation value of the leakage amount of fuel (leakage estimation value) on the basis of, for example, the initial leakage of the high-pressure pump 3 and the change factor for leakage, such as the operating time of the high-pressure pump 3, and outputs the calculated estimation value to the adder 8d.

The adder 8d adds the leakage estimation value, which is input from the leakage amount estimation unit 8c, to the fuel supply amount, which is input from the rotation speed-fuel supply amount conversion table 8b, to correct the fuel supply amount, and outputs the corrected fuel supply amount, which is the result of the addition, to the selection switch 8f as a second control amount S2. That is, since the fuel supply amount corresponding to the motor-rotation speed is corrected by the leakage estimation value, the second control amount S2 represents a fuel supply amount that is closer to the actual amount of fuel discharged from the high-pressure pump 3 than the fuel supply amount corresponding to the motor-rotation speed.

The rotation speed-fuel supply amount conversion table 8b, the leakage amount estimation unit 8c, and the adder 8d constitute a second control amount generation unit that generates the second control amount S2 on the basis of a pump-rotation speed input from the electric motor 4.

The switching logic circuit 8e is a logic circuit that generates a switching signal C on the basis of the motor-rotation speed. That is, in a case where the motor-rotation speed is equal to or lower than a predetermined switching threshold, the switching logic circuit 8e generates a switching signal C causing the selection switch 8f to select the first control amount S1. In a case where the motor-rotation speed exceeds the switching threshold, the switching logic circuit 8e generates a switching signal C causing the selection switch 8f to select the second control amount S2 instead of the first control amount S1.

Here, the switching threshold is set to a motor-rotation speed that is immediately before the above-mentioned pressurising valve 5 is opened. That is, in a state where the pressurizing valve 5 is closed, that is, in a low flow-rate range where the flow rate of fuel is relatively low, the switching logic circuit 8e generates a switching signal C causing the selection switch 8f to select the first control amount S1 and outputs the switching signal C to the selection switch 8f. On the other hand, in a state where the pressurizing valve 5 is opened from a state immediately before the pressurizing valve 5 is opened, that is, in a high flow-rate range where the flow rate of fuel is relatively high, the switching logic circuit 8e generates a switching signal C causing the selection switch 8f to select the second control amount S2 and outputs the switching signal C to the selection switch 8f.

Further, to avoid the instability of a switching operation in a case where the motor-rotation speed changes near the switching threshold, that is, to avoid a phenomenon where the first control amount S1 and the second control amount S2 are frequently switched, the switching logic circuit 8e uses different values as a switching threshold employed in a case where the motor-rotation speed tends to increase and a switching threshold employed in a case where the motor-rotation speed tends to decrease. That is, the switching logic circuit 8e allows the switching operation between the first control amount S1 and the second control amount S2 to have hysteresis characteristics.

The selection switch 8f alternatively selects the first control amount S1 or the second control amount S2 on the basis of the switching signal C. The selection switch 8f outputs the control amount, which is selected by the selection switch 8f, (the first control amount S1 or the second control amount S2) to the subtractor 8g. The selection switch 8f and the switching logic circuit 8e constitute a control amount selection unit of this embodiment.

The subtractor 8g calculates a deviation (fuel supply amount deviation) of the output (fuel supply amount) of the selection switch 8f from the control target value (the control target value about the flow rate of fuel) input from FADEC, and outputs the fuel supply amount deviation to the control calculation unit 8h. The control calculation unit 8h generates an operation amount of the electric motor 4 by performing predetermined calculation processing (PID calculation processing) on the fuel supply amount deviation input from the subtractor 8g. Here, since the high-pressure pump 3 is rotationally driven by the electric motor 4, the operation amount generated by the control calculation unit 8h is the operation amount of the electric motor 4 and is also the operation amount of the high-pressure pump 3.

Subsequently, the operation of the fuel supply control device 8 according to this embodiment will be described in detail.

The fuel supply control device 8 generates an operation amount of the electric motor 4 (high-pressure pump 3) to allow a fuel supply amount to be equal to the control target value and outputs the operation amount to the high-pressure pump 3 (fuel supply pump) to perform the feedback control of the high-pressure pump 3 as a basic operation. That is, a deviation calculated by the subtractor 8g of the fuel supply control device 8 is input to the control calculation unit 8h, so that an operation amount allowing the fuel supply amount to be equal to the control target value is generated.

Here, in the fuel supply control device 8, the first control amount S1 or the second control amount S2 selected by the selection switch 8f is input to the subtractor 8g as a control amount. Further, the selection of the control amount performed by the selection switch 8f is performed on the basis of the switching signal C. The switching signal C causes the selection switch 8f to select the first control amount S1 in a case where the motor-rotation speed is equal to or lower than a predetermined switching threshold, and causes the selection switch 8f to select the second control amount S2 instead of the first control amount S1 in a case where the motor-rotation speed exceeds the switching threshold.

That is, in a case where the motor-rotation speed is equal to or lower than the switching threshold, that is, in a low-flow rate range where the pressurizing valve 5 is closed and a fuel supply amount is relatively small, the feedback control of the high-pressure pump 3 is performed so that the first control amount S1 generated by the differential pressure-fuel supply amount conversion table 8a (first control amount generation unit) on the basis of a front-rear differential pressure across the metering valve is equal to the control target value.

On the other hand, in a case where the motor-rotation speed exceeds the switching threshold, that is, in a high flow-rate range where a fuel supply amount is relatively large which is in a state where the pressurizing valve 5 is opened from a state immediately before the pressurizing valve 5 is opened, the feedback control of the high-pressure pump 3 is performed so that the second control amount S2 generated by the second control amount generation unit (the rotation speed-fuel supply amount conversion table 8b, the leakage amount estimation unit 8c, and the adder 8d) on the basis of the motor-rotation speed and the leakage estimation value without using the front-rear differential pressure across the metering valve is equal to the control target value.

According to this embodiment, since the feedback control of the high-pressure pump 3 is performed using the second control amount S2 generated on the basis of the motor-rotation speed and the leakage estimation value in a high flow-rate range after the pressurizing valve 5 is opened, stable fuel supply control can be achieved in the high flow-rate range.

Further, according to this embodiment, since the feedback control of the high-pressure pump 3 is performed using the first control amount S1 generated on the basis of the front-rear differential pressure across the metering valve in a low flow-rate range where the pressurizing valve 5 is closed, stable fuel supply control can be achieved even in the low flow-rate range.

Furthermore, according to this embodiment, since the first control amount S1 is generated using the differential pressure fuel supply amount conversion table 8a (first control amount generation unit), the first control amount S1 is a control amount that corresponds to an actual fuel supply amount with high accuracy. Therefore, according to this embodiment, highly accurate fuel supply control can be achieved in a low flow-rate range before the pressurizing valve 5 is opened.

Further, according to this embodiment, since the second control amount S2 is generated using the rotation speed-fuel supply amount conversion table 8b, the second control amount S2 is a control amount that corresponds to an actual fuel supply amount with high accuracy. Therefore, according to this embodiment, highly accurate fuel supply control can be achieved in a high flow-rate range after the pressurizing valve 5 is opened.

Furthermore, according to this embodiment, since the leakage amount estimation unit 8c and the adder 8d are provided in addition to the rotation speed-fuel supply amount conversion table 8b, the second control amount S2 based on not only the motor-rotation speed but also the leakage estimation value is generated. Therefore, according to this embodiment, a fuel supply amount corresponding to an actual fuel supply amount with high accuracy can be generated. As a result, more highly accurate fuel supply control can be achieved in a high flow-rate range after the pressurizing valve 5 is opened.

The disclosure is not limited to each embodiment, and, for example, the following modification examples are considered.

(1) The motor-rotation speed is treated as the rotation speed of the fuel supply pump in the embodiment, but the disclosure is not limited thereto. For example, a rotation sensor for detecting the rotation speed of the high-pressure pump 3 may be provided and the output of the rotation sensor may be taken as the rotation speed of the fuel supply pump.

Figure 3:
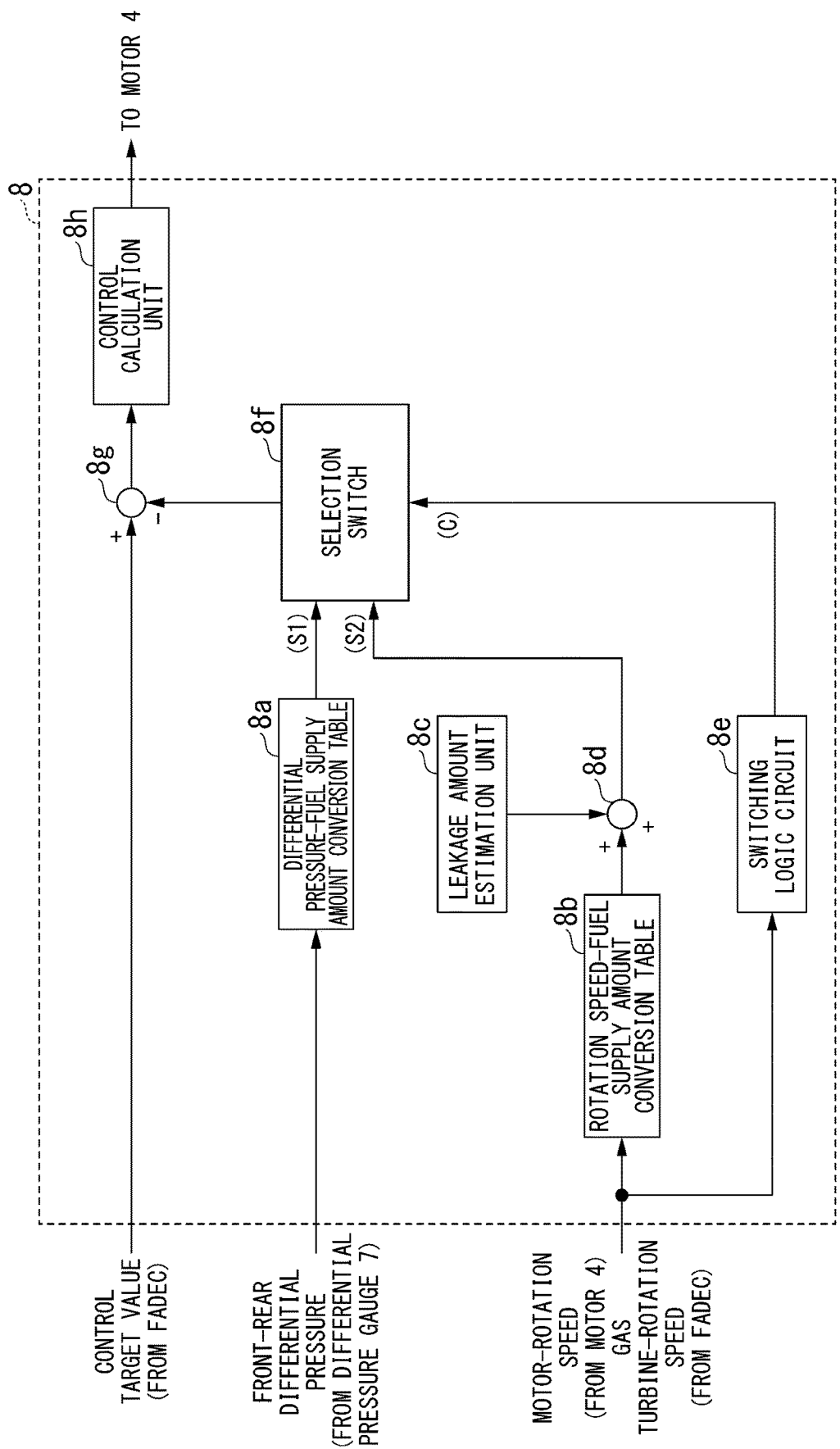
FIG. 3 is a block diagram showing the functional configuration of a fuel supply control device according to a modification example of the embodiment of the disclosure.

Further, as shown in FIG. 3 showing a modification example of the embodiment of the disclosure, a signal (engine rotation speed signal) representing the rotation speed of the gas turbine G may be taken from FADEC. In this case, the switching logic circuit 8e of the embodiment may be a logic circuit that generates a switching signal C on the basis of the rotation speed of the gas turbine G instead of the motor-rotation speed. Further, the selection switch 8f may alternatively select the first control amount S1 or the second control amount S2 on the basis of the switching signal C and the rotation speed of the gas turbine G instead of the motor-rotation speed. Even in this case, the selection switch 8f and the switching logic circuit 8e constitute a control amount selection unit of the modification example of the embodiment of the disclosure. Since other configuration is the same as that of the embodiment, derailed description thereof will be omitted.

(2) The control calculation unit 8h performing PID calculation processing on a fuel supply amount deviation is employed in the embodiment, but the disclosure is not limited thereto. Various kinds of processing are considered as the control calculation processing of the control calculation unit 8h in addition to simple PID calculation processing.

(3) The gas turbine G is a destination to which fuel is supplied in the embodiment, but the disclosure is not limited thereto.

INDUSTRIAL APPLICABILITY

According to the fuel supply control device of the disclosure, stable fuel supply control can be achieved in a high flow-rate range after the pressurizing valve is opened.

What is claimed is:

1. A fuel supply control device for a gas turbine that is configured to control a fuel supply pump on the basis of a front-rear differential pressure across a metering valve for a fuel supply amount, which is detected by a differential pressure gauge, using parallel flow passages of an orifice and a pressurizing valve as the metering valve, the fuel supply control device comprising:
   a first control amount generation unit that is configured to generate a first control amount on the basis of the front-rear differential pressure;
   a second control amount generation unit that is configured to generate a second control amount on the basis of a rotation speed of the fuel supply pump;
   a control amount selection unit that is configured to alternatively select the first control amount or the second control amount on the basis of the rotation speed and to output the selected control amount;
   a subtractor that is configured to calculate a deviation of the output of the control amount selection unit from a control target value and to output the deviation; and a control calculation unit that is configured to calculate an operation amount of the fuel supply pump on the basis of the output of the subtractor,
wherein the control amount selection unit is configured to select the first control amount in a case where the rotation speed is equal to or lower than a predetermined threshold and to select the second control amount instead of the first control amount in a case where the rotation speed exceeds the threshold.

2. The fuel supply control device according to claim 1, wherein the first control amount generation unit is configured to generate the first control amount on the basis of a differential pressure-fuel supply amount conversion table showing a relationship between the front-rear differential pressure and a flow rate of fuel.

3. The fuel supply control device according to claim 2, wherein the second control amount generation unit is configured to generate the second control amount on the basis of a rotation speed-fuel supply amount conversion table showing a relationship between the rotation speed and a flow rate of fuel.

4. The fuel supply control device according to claim 3, wherein the second control amount generation unit is configured to generate the second control amount by correcting an output of the rotation speed-fuel supply amount conversion table on the basis of an estimation value of leakage amount of fuel acquired in advance about the fuel supply pump.

5. The fuel supply control device according to claim 4, wherein the second control amount generation unit is configured to generate the second control amount by taking a rotation speed of a motor, which drives the fuel supply pump, as the rotation speed of the fuel supply pump.

6. The fuel supply control device according to claim 3, wherein the second control amount generation unit is configured to generate the second control amount by taking a rotation speed of a motor, which drives the fuel supply pump, as the rotation speed of the fuel supply pump.

7. The fuel supply control device according to claim 2, wherein the second control amount generation unit is configured to generate the second control amount by taking a rotation speed of a motor, which drives the fuel supply pump, as the rotation speed of the fuel supply pump.

8. The fuel supply control device according to claim 2, wherein the control calculation unit is configured to calculate the operation amount of the fuel supply pump by performing PID calculation processing on the output of the subtractor.

9. The fuel supply control device according to claim 1, wherein the second control amount generation unit is configured to generate the second control amount on the basis of a rotation speed-fuel supply amount conversion table showing a relationship between the rotation speed and a flow rate of fuel.

10. The fuel supply control device according to claim 9, wherein the second control amount generation unit is configured to generate the second control amount by correcting an output of the rotation speed-fuel supply amount conversion table on the basis of an estimation value of leakage amount of fuel acquired in advance about the fuel supply pump.

11. The fuel supply control device according to claim 10, wherein the second control amount generation unit is configured to generate the second control amount by taking a rotation speed of a motor, which drives the fuel supply pump, as the rotation speed of the fuel supply pump.

12. The fuel supply control device according to claim 9, wherein the second control amount generation unit is configured to generate the second control amount by taking a rotation speed of a motor, which drives the fuel supply pump, as the rotation speed of the fuel supply pump.

13. The fuel supply control device according to claim 1, wherein the second control amount generation unit is configured to generate the second control amount by taking a rotation speed of a motor, which drives the fuel supply pump, as the rotation speed of the fuel supply pump.

14. The fuel supply control device according to claim 1, wherein the control calculation unit is configured to calculate the operation amount of the fuel supply pump by performing PID calculation processing on the output of the subtractor.

15. A fuel supply control device for a gas turbine that is configured to control a fuel supply pump on the basis of a front-rear differential pressure across a metering valve for a fuel supply amount, which is detected by a differential pressure gauge, using parallel flow passages of an orifice and a pressurizing valve as the metering valve, the fuel supply control device comprising:
a first control amount generation unit that is configured to generate a first control amount on the basis of the front-rear differential pressure;
a second control amount generation unit that is configured to generate a second control amount on the basis of a rotation speed of the fuel supply pump;
a control amount selection unit that is configured to alternatively select the first control amount or the second control amount on the basis of a rotation speed of the gas turbine and to output the selected control amount;
a subtractor that is configured to calculate a deviation of the output of the control amount selection unit from a control target value and to output the deviation; and
a control calculation unit that is configured to calculate an operation amount of the fuel supply pump on the basis of the output of the subtractor,
wherein the control amount selection unit is configured to select the first control amount in a case where the rotation speed of the gas turbine is equal to or lower than a predetermined threshold and to select the second control amount instead of the first control amount in a case where the rotation speed exceeds the threshold.

16. A fuel supply control device for a gas turbine that is configured to control a fuel supply pump on the basis of a front-rear differential pressure across a metering valve for a fuel supply amount, which is detected by a differential pressure gauge, using parallel flow passages of an orifice and a pressurizing valve as the metering valve, the fuel supply control device comprising:
a first control amount generation unit that is configured to generate a first control amount on the basis of the front-rear differential pressure;
a second control amount generation unit that is configured to generate a second control amount on the basis of a rotation speed of the fuel supply pump;
a control amount selection unit that is configured to alternatively select the first control amount or the second control amount on the basis of a rotation speed of the gas turbine and to output the selected control amount;

a subtractor that is configured to calculate a deviation of the output of the control amount selection unit from a control target value and to output the deviation; and a control calculation unit that is configured to calculate an operation amount of the fuel supply pump on the basis of the output of the subtractor, wherein the control amount selection unit is configured to select the first control amount in a case where the rotation speed of the gas turbine is equal to or lower than a predetermined threshold and to select the second control amount instead of the first control amount in a case where the rotation speed exceeds the threshold, and wherein the first control amount generation unit is configured to generate the first control amount on the basis of a differential pressure-fuel supply amount conversion table showing a relationship between the front-rear differential pressure and a flow rate of fuel.

17. A fuel supply control device for a gas turbine that is configured to control a fuel supply pump on the basis of a front-rear differential pressure across a metering valve for a fuel supply amount, which is detected by a differential pressure gauge, using parallel flow passages of an orifice and a pressurizing valve as the metering valve, the fuel supply control device comprising:

a first control amount generation unit that is configured to generate a first control amount on the basis of the front-rear differential pressure;

a second control amount generation unit that is configured to generate a second control amount on the basis of a rotation speed of the fuel supply pump;

a control amount selection unit that is configured to alternatively select the first control amount or the second control amount on the basis of a rotation speed of the gas turbine and to output the selected control amount;

a subtractor that is configured to calculate a deviation of the output of the control amount selection unit from a control target value and to output the deviation; and a control calculation unit that is configured to calculate an operation amount of the fuel supply pump on the basis of the output of the subtractor, wherein the control amount selection unit is configured to select the first control amount in a case where the rotation speed of the gas turbine is equal to or lower than a predetermined threshold and to select the second control amount instead of the first control amount in a case where the rotation speed exceeds the threshold, and wherein the second control amount generation unit is configured to generate the second control amount on the basis of a rotation speed-fuel supply amount conversion table showing a relationship between the rotation speed and a flow rate of fuel.

18. A fuel supply control device for a gas turbine that is configured to control a fuel supply pump on the basis of a front-rear differential pressure across a metering valve for a fuel supply amount, which is detected by a differential pressure gauge, using parallel flow passages of an orifice and a pressurizing valve as the metering valve, the fuel supply control device comprising:

a first control amount generation unit that is configured to generate a first control amount on the basis of the front-rear differential pressure;

a second control amount generation unit that is configured to generate a second control amount on the basis of a rotation speed of the fuel supply pump;

a control amount selection unit that is configured to alternatively select the first control amount or the second control amount on the basis of a rotation speed of the gas turbine and to output the selected control amount;

a subtractor that is configured to calculate a deviation of the output of the control amount selection unit from a control target value and to output the deviation; and a control calculation unit that is configured to calculate an operation amount of the fuel supply pump on the basis of the output of the subtractor, wherein the control amount selection unit is configured to select the first control amount in a case where the rotation speed of the gas turbine is equal to or lower than a predetermined threshold and to select the second control amount instead of the first control amount in a case where the rotation speed exceeds the threshold, and wherein the second control amount generation unit is configured to generate the second control amount by correcting an output of a rotation speed-fuel supply amount conversion table on the basis of an estimation value of leakage amount of fuel acquired in advance about the fuel supply pump.

* * * * *